Figure 1:
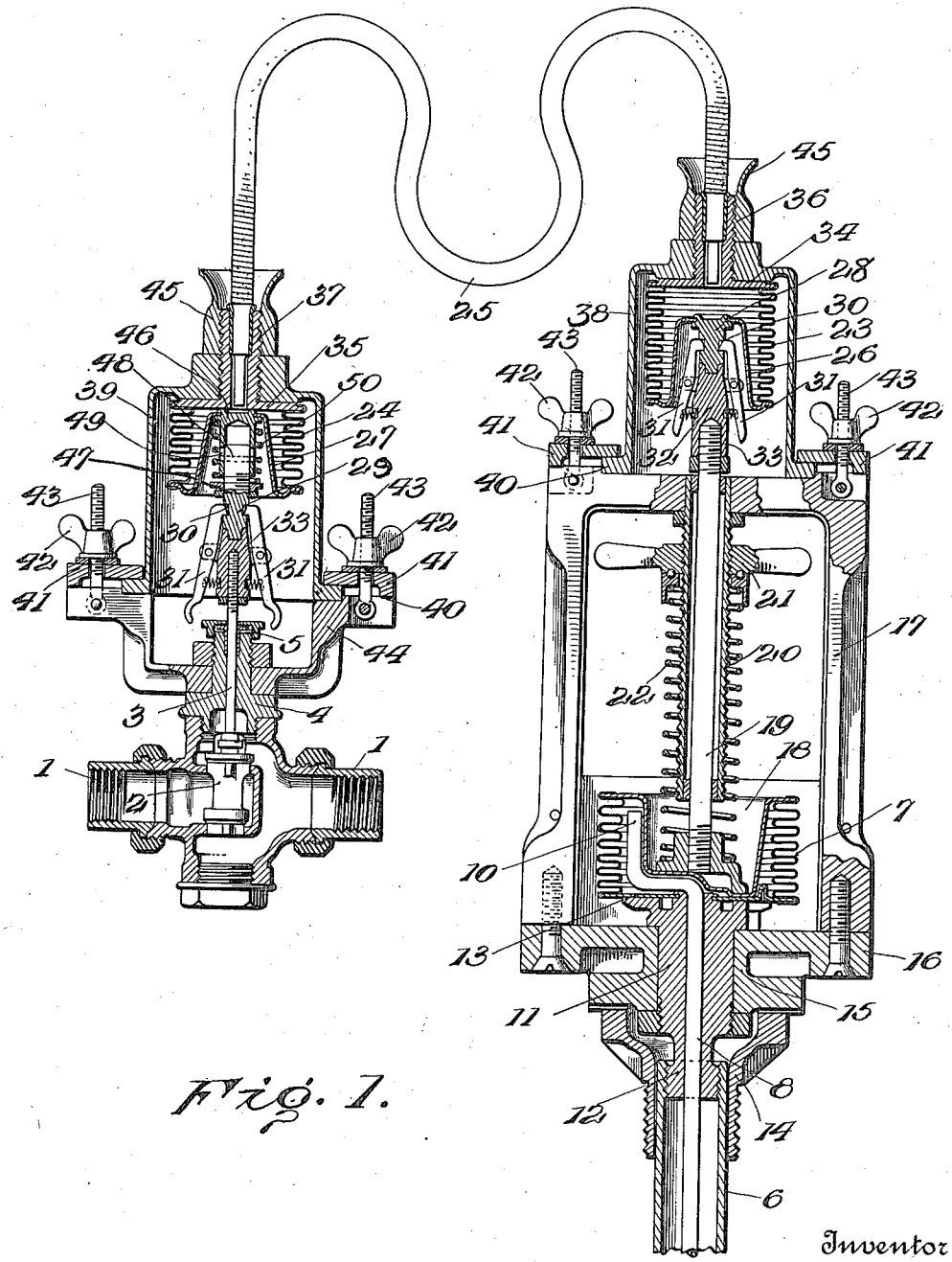

W. M. FULTON.
TANK REGULATOR.
APPLICATION FILED SEPT. 23, 1918.

1,300,717.

Patented Apr. 15, 1919.
2 SHEETS—SHEET 1.

Inventor
Weston M. Fulton

By
Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TANK-REGULATOR.

1,300,717.      Specification of Letters Patent.      Patented Apr. 15, 1919.

Application filed September 23, 1918. Serial No. 255,874.

*To all whom it may concern:*

Be it known that I, WESTON M. FULTON, a citizen of the United States, residing at Knoxville, Tennessee, have invented a new and useful Improvement in Tank-Regulators, which invention is fully set forth in the following specification.

This invention relates to the transmission of power between a thermostat and an element to be controlled and, while capable of a wide variety of uses, has particular utility when applied to the transmission of power between the thermostat and the valve mechanism of a tank regulator.

It has heretofore been proposed, as in my Patent No. 1,102,035, granted June 30, 1914, to operate the valve mechanism of a tank regulator by a thermostatic device charged with a thermosensitive fluid and comprising a bulb in heat interchanging relation with the heated fluid, an expansible and contractible vessel operatively connected to the valve mechanism and a flexible conduit between said bulb and vessel, said flexible conduit being highly desirable both because enabling the device to be compactly packed for transportation and because capable of being readily bent into any desired form to meet the exigencies of the installation.

Experience has taught, however, that this flexible conduit frequently becomes broken and in such event the entire regulator has to be disconnected and returned to the factory for repair, it being practically impossible to insert a new tube and charge the device with its contained fluid at the installation because such requires skilled workmen and specially designed apparatus. Furthermore, not only does the disconnection of the tank regulator require a skilled workman but the time necessarily consumed in returning the device to the factory and in repairing it has caused such dissatisfaction as tends to oppose a widespread use of this type of device.

It is an object of this invention to provide a tank regulator with a device for transmitting power from the thermostat to the valve mechanism in the form of a readily attachable and detachable unit whereby, upon breakage, a new transmission device may be installed without delay and without the employment of skilled labor.

A further object of this invention is to provide a transmission device which is so simple and compact in structure that the same may be readily forwarded by parcel post and installed by janitors and householders and that a supply thereof may be readily maintained, transported and installed by salesmen.

Another object of the invention is to provide a transmission device which has a readily flexible connection whereby the device may be compactly packed and such connection readily bent without the use of special tools to meet the exigencies of the installation.

Yet another object of the invention is to provide a transmission device employing a fluid power-transmission which avoids the use of unions, couplings or other joints of a mechanical nature which may be tampered with, and which provides an integral, fluid-tight unit that insures against loss of the contained fluid and the adjustment of the parts.

Still another object of the invention is to provide a power-transmission unit which can be readily attached to and detached from a thermostat and an element to be controlled without the use of tools or skilled labor.

Yet another object of this invention is to provide a power-transmission device with a slip connection whereby, after the element to be controlled has reached an extreme position, the further transmission of power will not cause injury to the parts. Other objects will appear as the description of the invention proceeds.

Stated generally, the invention as applied to a tank regulator comprises, in combination with the valve mechanism of the tank regulator and a thermostat, a separate, integral power-transmission device between said thermostat and said valve mechanism, said transmission device constituting a readily attachable and detachable unit. Said transmission device preferably employs a fluid power-transmission and is shown as including two fluid-containing chambers communicating through a readily flexible tube. The invention embraces not only the use of the improved power-transmission device between the thermostat and the valve mechanism of a tank regulator, but also the use of the improved power-transmission device between a thermostat and any suitable element to be controlled.

The invention is capable of receiving a variety of mechanical expressions, one of which is shown on the accompanying drawings, but it is to be expressly understood that the drawings are for the purpose of illustration only and are not to be construed as a definition of the limits of the invention, reference being had to the appended claims for that purpose.
In said drawings, Figure 1 is a sectional view through a tank regulator embodying the present invention and shows the power-transmission unit in operative position.

Figure 2:
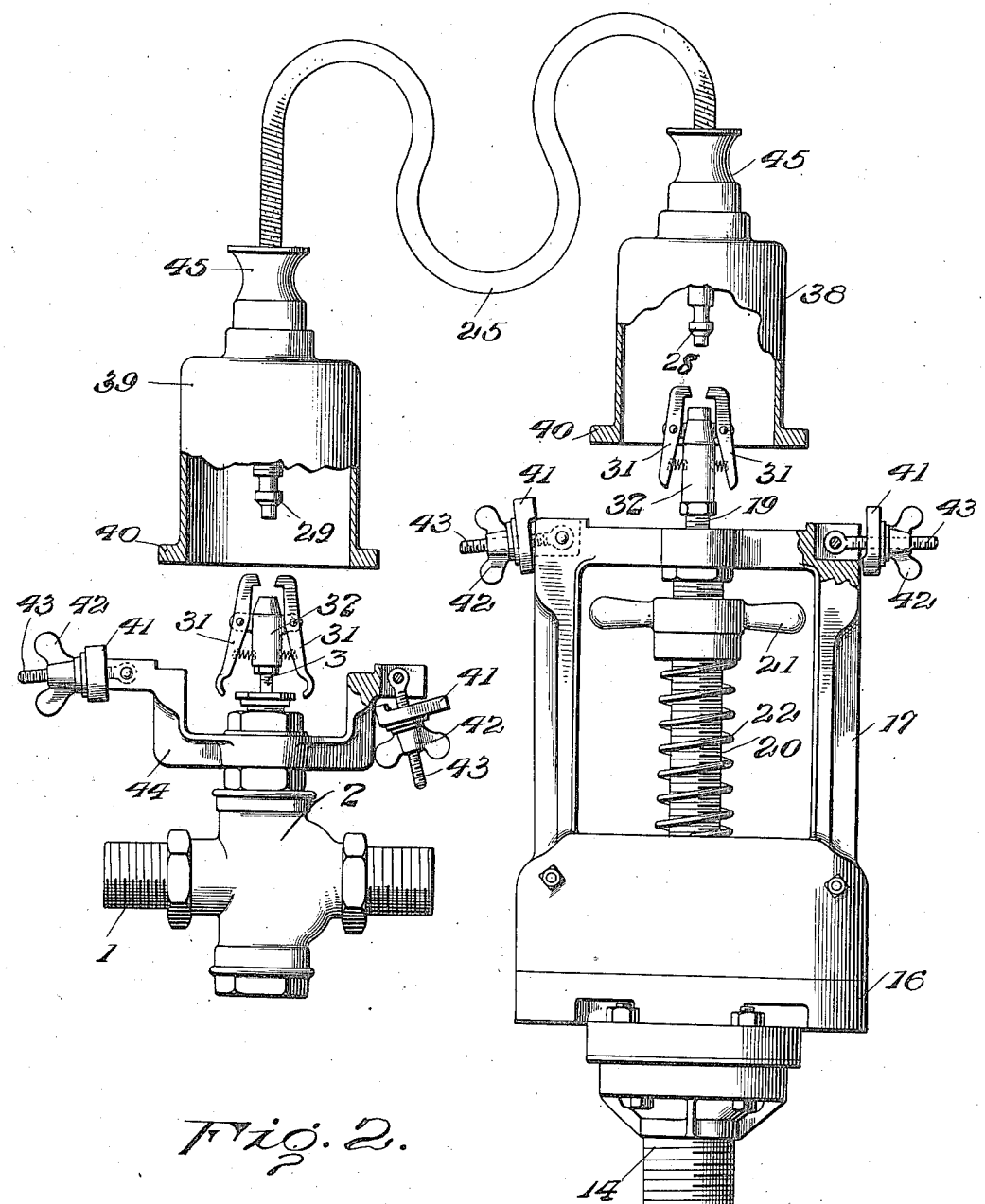

Fig. 2 is an elevation of a tank regulator embodying the present invention, the power transmission unit being shown detached from the thermostat and the valve mechanism.

Referring in detail to said drawings, 1 designates a conduit for supplying a heating medium and containing a valve mechanism 2 of any suitable construction. In the form shown, the stem 3 of said valve extends through the bonnet 4 and is provided with a suitable packing at 5.

To operate the valve mechanism 2 there is provided a thermostat of any suitable construction. In the form shown, said thermostat comprises a bulb 6, an expansible and contractible vessel 7, preferably constructed of corrugated, resilient metal, and a conduit 8 between said bulb and vessel. Said conduit preferably extends to a point adjacent the free end of the bulb 6 where it is deflected laterally to constitute a trap-connection as shown at 9 and, in order that the thermostat may operate properly in whatever position it may be held, said conduit also preferably extends within the vessel 7 to a point adjacent both the outer end and the side walls thereof as shown at 10. By preference, vessel 7 and conduit 8 are filled and bulb 6 partially filled with a volatile liquid, the remainder of the space within the bulb being occupied by the vapor of said liquid. Changes of temperature at the bulb cause volatilization or condensation of the fluid therein, with a corresponding increase or decrease of pressure of the vapor on the liquid in the bulb, which pressure is transmitted to the liquid in the vessel 7 to expand or permit contraction of said vessel, only liquid flowing through the conduit 8 to and from the vessel 7 owing to the trap-connection at 9. The conduit 8 is shown as carried by a sleeve 11 to which is connected a screw-threaded plug 12 for closing the end of the bulb 6, the stationary wall 13 of the expansible and contractible vessel 7 being also suitably connected to said sleeve 11. A screw-threaded bushing 14 is shown on the bulb 6 for mounting the same in the wall of a tank, chamber, conduit or other element. Mounted on the sleeve 11, in the form shown, is a collar 15 provided with a flange 16 to which is attached a framework 17. Suitably connected to the movable end wall 18 of the vessel 7 is a stem 19 which extends through a tube 20 carried by the frame 17, said tube being provided on its exterior surface with screw-threads and carrying a hand-nut 21, between which and the movable wall 18 of the vessel 7 is a coil spring 22, whereby the temperature at which the vessel 7 will begin to expand may be preliminarily adjusted. While the thermostatic device employed has thus been described with considerable particularity, it is to be expressly understood that the invention is not limited to the use of a thermostat of this particular construction, as any suitable thermostatic device may be employed within the purview of this invention. The term "thermostat" as used herein, however, is to be understood as meaning a temperature-responsive and force-transmitting device, whether composed of one or more elements and of whatever suitable type.

In accordance with the present invention a separate, integral power-transmission device constituting a readily attachable and detachable unit is provided between the stem 19 of the thermostatic device and the stem 3 of the valve mechanism. In the form shown, said transmission device includes two expansible and contractible vessels 23 and 24, preferably constructed of corrugated, resilient metal, communicating through a readily flexible tube 25 of any suitable construction, such for example as disclosed in my application Serial No. 128,092, filed October 27, 1916, and entitled Flexible conduits. Vessels 23 and 24 and tube 25 have sealed therein a suitable power-transmitting fluid such as a light animal or vegetable oil or a non-freezing mixture as of alcohol and water. In order that said vessels 23 and 24 may be readily attached to and detached from the stems 19 and 3 respectively, the movable end walls 26 and 27 of said vessels are respectively provided, in the form shown, with stems 28 and 29 each having a groove 30, and the stems 19 and 3 are respectively provided with spring-pressed levers 31 having projections at their outer ends to engage within the grooves 30. Said levers 31 are shown as pivoted on members 32 suitably attached to the stems 19 and 3, as by the screw-threaded connections illustrated at 33. While the readily attachable and detachable connections between the power-transmitting unit and the thermostat and the valve mechanism have been shown as composed of levers normally urged by springs into engagement with locking grooves on stems carried by the movable walls of the expansible and contractible vessels, it is to be expressly understood that any other suitable type of readily attachable and detachable connection may be employed without departing from the spirit of this invention.

The stationary walls 34 and 35 of the vessels 23 and 24 respectively are provided, in the form shown, with screw-threaded projections 36 and 37 in which the ends of the flexible tube 25 are secured so as to constitute permanent fluid-tight joints. Mounted on the projections 36 and 37 are housings 38 and 39, each provided with a flange as shown at 40. Housing 38 may be attached to frame 17 in any suitable way as by a plurality of clamping plates 41 retained in engagement with the flange 40 by wing nuts 42 received on pivoted bolts 43. Housing 39 may also be similarly attached to a frame 44 mounted in any suitable way on the bonnet 4 of valve 2. To prevent the tube 25 from being sharply bent at its connection with the projections 36 and 37, funnel-shaped guide members 45 are shown mounted on said projections.

In order that the parts may not be injured in case power is transmitted from the thermostat after the valve mechanism or other element to be controlled has reached its extreme position, a slip-connection is preferably interposed in the power-transmission. In the form shown, stem 28 is formed of two telescopic parts 46 and 47 connected by a pin 48 on one of said parts which works in slots 49 in the other of said parts. A spring 50 of sufficient strength to normally transmit power from the thermostat to the valve mechanism is mounted between flanges suitably provided on said parts 46 and 47. In case further pressure be exerted by vessel 24 after valve 2 has moved to its closed position, spring 50 will give and parts 46 and 47 will have relative telescopic movement.

It will therefore be seen that a transmission device has been provided for operating the valve mechanism from the thermostat in the form of a compact, separate, integral unit which can be readily detached from the thermostat and valve mechanism without disturbing the valve mechanism and thermostat by loosening the wing nuts 42, turning the bolts 43 and clamping plates 41 to the position shown in Fig. 2 and manually operating the levers 31 through apertures in the frames or the housings so as to withdraw their ends from engagement with the groove 30. Thereupon a substitute transmission device may be as readily attached to the thermostat and valve mechanism without the employment of special tools or skilled labor.

It will further be seen that the vessels 23 and 24 and the communicating tube 25 constitute a sealed fluid power-transmission unit employing no unions, couplings or other joints of a mechanical nature which can be tampered with. It will also be apparent that, owing to the readily flexible tube connection 25, the transmission device may be compactly packed for transmission through the mails or for convenient storage and transportation by salesmen, and this tube may also be bent into any desired form and without the use of special tools to meet the exigencies of the installation.

It therefore becomes possible in case tube 25 is broken or the device otherwise injured to substitute a new transmission device without delay and such substitution may be made by a salesman, janitor or householder without requiring the aid of special tools or skilled workmen.

While the embodiment of the invention illustrated on the drawings has been described with considerable particularity it is to be expressly understood that the invention is not to be restricted thereto, as the same is capable of receiving a variety of mechanical expressions some of which will readily suggest themselves to those skilled in the art, while certain features thereof are capable of use without other features thereof. Reference is therefore to be had to the appended claims for a definition of the limits of this invention.

What is claimed is:

1. A device for operating a valve from a thermostat comprising a fluid power-transmission unit having a fluid sealed therein and including a flexible connection, and means whereby said unit may be readily attached to and detached from the valve and the thermostat.

2. A device for operating a valve from a thermostat comprising a fluid power-transmission unit having a fluid sealed therein and including power-transmitting members and a flexible tube therebetween, and means whereby said unit may be readily attached to and detached from the valve and the thermostat.

3. A device for operating a valve from a thermostat comprising power-transmitting members and a flexible member operatively connected to said power-transmitting members, said members together constituting a power-transmitting unit, and means on said power-transmitting members whereby said unit may be readily attached to and detached from the valve and the thermostat.

4. In combination with valve mechanism, a thermostat, means for operating said valve mechanism from said thermostat including two expansible and contractible vessels and a tube communicating therebetween, said vessels and tube being charged with a power-transmitting fluid and constituting a readily attachable and detachable unit and means whereby said unit may be attached to and detached from said valve mechanism and said thermostat without disturbing the valve mechanism and thermostat.

5. In combination with the valve mechanism, a thermostat, and means for operating said valve mechanism from said thermostat including two expansible and contractible vessels and a readily flexible tube communicating therebetween, said vessels and tube being filled with a power-transmitting fluid and constituting a readily attachable and detachable unit.

6. In combination with valve mechanism, a thermostat, and means for operating said valve mechanism from said thermostat including two expansible and contractible vessels and a flexible tube permanently connected therewith and communicating therebetween, said vessels and tube having a power-transmission fluid sealed therein and constituting a readily attachable and detachable unit.

7. In combination with valve mechanism, a thermostat, and means for operating said valve mechanism from said thermostat including power-transmitting members, a flexible member operatively connected to said power-transmitting members, said members together constituting a power-transmitting unit, and means whereby said power-transmitting members may be manually attached to and detached from said valve mechanism and said thermostat without disturbing said valve mechanism and thermostat.

8. In combination with valve mechanism, a thermostat, means for operating said valve mechanism from said thermostat including two chambers having movable walls and a connecting tube, said chambers and tube being charged with a power-transmitting fluid and constituting a readily attachable and detachable unit, and means whereby said unit may be attached to and detached from said valve mechanism and said thermostat without disturbing said valve mechanism and thermostat.

9. In combination with valve mechanism, a thermostat, and means for operating said valve mechanism from said thermostat including fluid-containing chambers communicating through a readily flexible tube, said chambers and tube constituting a readily attachable and detachable unit.

10. A unit for transmitting power between a thermostat and an element to be controlled comprising two expansible and contractible vessels, a flexible tube communicating therebetween, said vessels and tube being filled with a power-transmitting fluid, and means whereby said unit may be readily attached to and detached from said thermostat and said element to be controlled.

11. A unit for transmitting power between a thermostat and an element to be controlled comprising two fluid-containing chambers having movable walls, a readily flexible tube connecting said chambers, and means whereby said unit may be readily attached to and detached from said thermostat and said element to be controlled.

12. A unit for transmitting power between a thermostat and an element to be controlled comprising two chambers having movable walls, a tube communicating with said chambers and permanently connected therewith, a fluid sealed in said chambers and tube, and means whereby said unit may be readily attached to and detached from said thermostat and said element to be controlled.

13. In a tank regulator, a pipe for conveying heating medium, a valve in said pipe, a thermostat to be positioned in heat-interchanging relation with the heated fluid, and means for operating said valve from said thermostat including a detachable, unitary power-transmission device comprising fluid-containing chambers and a flexible tube communicating therebetween.

14. In a tank regulator, a pipe for conveying heating medium, a valve in said pipe, a thermostat to be positioned in heat-interchanging relation with the heated fluid, and means for operating said valve mechanism for said thermostat comprising power-transmitting members, a flexible member operatively connected to said power-transmitting members, said members together constituting a power-transmitting unit, and means whereby said unit may be readily attached to and detached from said valve mechanism and said thermostat.

15. In combination with valve mechanism, a thermostat, and means for operating said valve mechanism from said thermostat including a power-transmission device readily attachable to and detachable from said valve mechanism and said thermostat, said power-transmitting device comprising chambers communicating through a flexible tube and having a fluid sealed therein.

16. In combination with valve mechanism, a thermostat, and means for operating said valve mechanism from said thermostat including a power-transmission device readily attachable to and detachable from said valve mechanism and said thermostat, said power-transmitting device comprising expansible and contractible chambers communicating through an interposed flexible tube and having a fluid sealed therein.

17. In combination with valve mechanism, a thermostat, means for operating said valve mechanism from said thermostat including an integral power-transmitting unit, means for readily attaching and detaching said unit to and from said valve mechanism and said thermostat, and a slip-connection between said power-transmitting unit and said valve mechanism.

18. In combination with valve mechanism, a thermostat, means for operating said valve mechanism from said thermostat including an integral power-transmitting unit, and means for readily attaching and detaching said unit to and from said valve mechanism and said thermostat, the connection between said unit and valve mechanism including relatively movable members normally maintained against relative movement by a spring.

19. In a tank regulator, a pipe for conveying heating medium, a valve in said pipe, a thermostat to be positioned in heat-interchanging relation with the heated fluid, a fluid power-transmitting device between said thermostat and said valve, and a slip-connection between said power-transmitting device and said valve whereby power may be transmitted by said device without injury to the parts when said valve has reached its extreme position.

In testimony whereof I have signed this specification.

WESTON M. FULTON.